INVENTOR.
EBEN H. CARRUTHERS
BY
ATTORNEYS

INVENTOR.
EBEN H. CARRUTHERS

INVENTOR.
EBEN H. CARRUTHERS
BY
*Thomson + Roessel*
ATTORNEYS

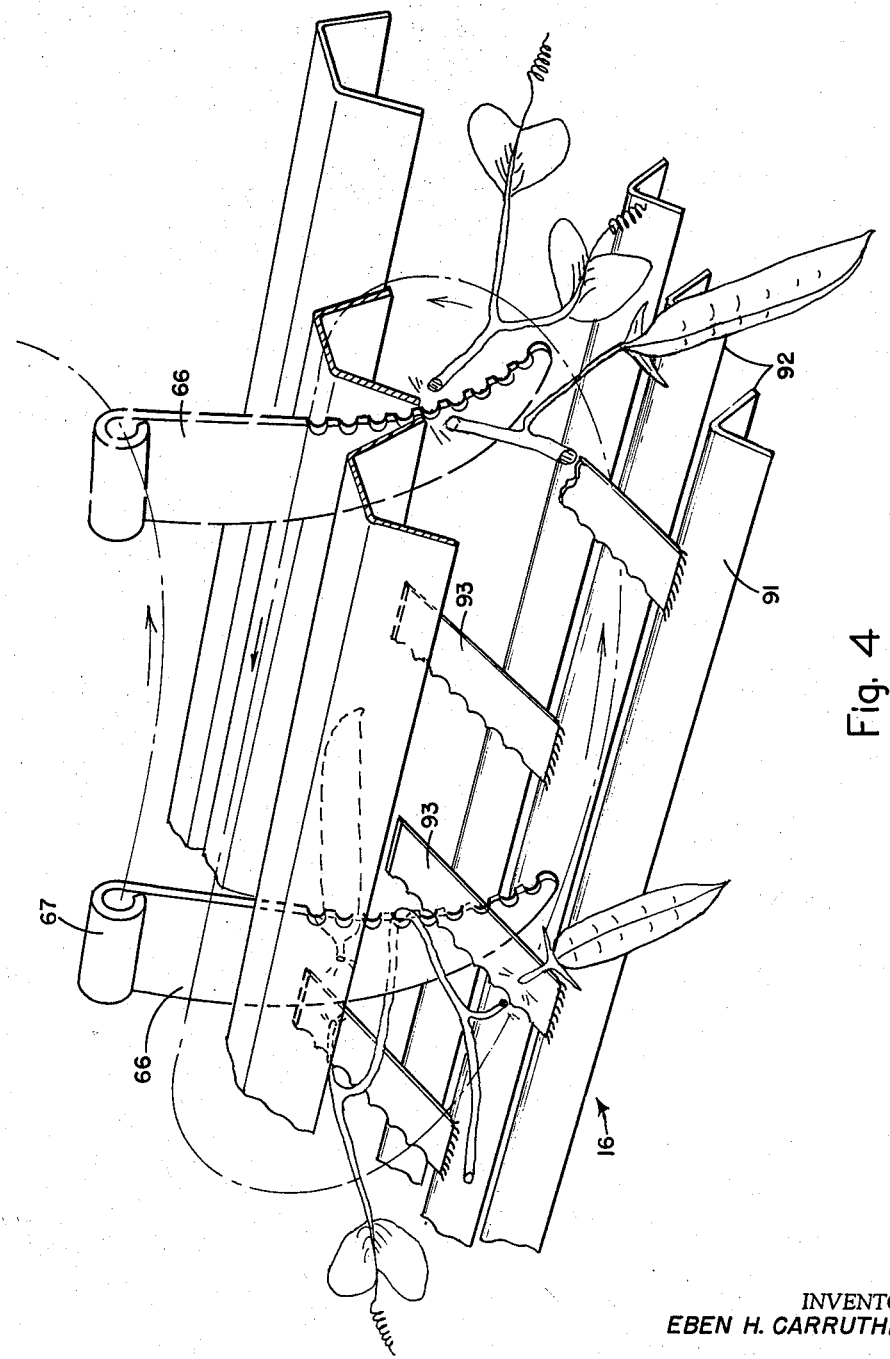

United States Patent Office 3,144,022
Patented Aug. 11, 1964

3,144,022
CUTTER BANK FOR HARVESTERS FOR POD
TYPE VEGETABLES
Eben H. Carruthers, Warrenton, Oreg., assignor to
Chisholm-Ryder Co., Inc., Niagara Falls, N.Y., a corporation of New York
Filed Jan. 11, 1962, Ser. No. 165,517
21 Claims. (Cl. 130—30)

This invention relates to harvesters for pod type vegetables and, more particularly, to a cutter bank for use in such machines for removing the pods from the vines and leaves so that the pod is substantially free of vines and leaves and may be separately collected for ultimate removal of the seeds from the pods for canning or freezing. Reference is made to my issued Patents Nos. 2,763,114; 2,943,430; 2,913,865 and 2,943,629.

In my above mentioned Patent No. 2,763,114, entitled Method for Harvesting Pod Type Vegetables, Cutting and Separating the Pods From the Stems and Leaves and Preparing the Vegetables for Canning or Freezing, and in Patent No. 2,943,430, entitled Machine for Harvesting Pod Type Vegetables, Canning and Separating the Pods From the Stems and Leaves and Preparing the Vegetables for Canning or Freezing, I have shown and described a method and a machine for harvesting peas, lima beans and other pod type vegetables.

While the invention of this application has broader use, it will be described in connection with the harvesting of peas. For the purposes of this application, it is sufficient to state that the method and machine of the above patents include a movable conveyance, preferably self-propelled, which is movable through the fields in a harvesting pattern. The machine carries, mounted thereon, means for removing substantially the whole pea plant from the field such as a sickle bar preferably mounted at the forward end of the machine; and a conveyor, conveyor reel or other means for carrying the substantially whole plants from the sickle bar to a cutter bed.

The cutter bed is of substantial width, preferably of a width corresponding to the width of the swath being cut from the field and is of substantial length to accommodate a multiplicity of cutting elements adapted to perform a multiplicity of rapidly repeated, successive cutting actions on the plants. The cutting or severing actions are adapted to cut the vines and leaves away from the pods so that the pods are substantially free of vines and leaves. The pods may then be separately collected by means located on the machine and the leaves and vines may be either spread back on the land or separately collected for use, for example, as cattle feed.

In so far as this invention is concerned, the means for separating the leaves and vines from the pods may be of any suitable type but preferably comprises a blower. The blower or fan directs an air blast through a falling stream of vines and leaves and pods, cut away from the vines and leaves, and separates the pods from the remainder of the plant by reason of the differences in specific gravity of the pods relative to the vines and leaves.

During the past eight years, I have built a number of experimental harvesters for pod type vegetables. Many problems have been encountered and, while the basic principles of the method and machine shown and described in the above mentioned patents have not changed, many substantial changes have been made directed toward improving the performance of the machine; increasing the yield from a given acreage of peas; and the production of a reliable, commercially successful machine.

The most serious problems have been encountered in connection with the design of the cutter or severing bed. While the various cutters shown in the above mentioned patents, and others not shown which I have built and tested, are adequate to meet most of the following requirements, the cutter bed shown in this application improves upon the performance of the machine in most of the respects enumerated below. It solves some of the distinct problems which have remained, the most notable of which has been clogging of the cutter bed with partly cut vines and leaves necessitating shutting down the machine at intervals to clean the cutter bed of material wrapped around elements of the cutter or severing bed or wedged between parts thereof.

In the following enumeration of the prerequisites or specifications of a cutter bed which have not necessarily been placed in the order of their importance, some of those enumerated are essential to a successful commercial machine while others may be characterized as highly desirable.

One of the important factors in designing a cutter bed is that the cutters must not damage, cut or open any material percentage of the pods passing through the machine. While a certain percentage of damaged pods is perhaps unavoidable, particularly since high speed operation is essential to a commercial machine, the percentage of damaged or cut pods must be maintained at a minimum. When the pods are damaged or cut, the peas, intended to be protected in the pods, are exposed to dust and loss of moisture. Any substantial percentage of damaged or cut pods defeats the purpose of the machine which is to radically change the present methods of pea harvesting and hold the peas protected in the pods until they are to be canned or frozen.

A second important aspect of the method and machine of my invention lies in cutting the vines and leaves by a multiplicity of successive and rapidly repeated cutting actions until the vines and leaves are in a relatively finely divided state. In such a finely divided state, the vines and leaves are less likely to clog the machine; readily pass through the cutter bed; and may be evenly spread over the swath just previously cut from the field for subsequent plowing under. The vines and leaves when plowed under are highly beneficial to the soil and their relatively even distribution over the land in a finely divided condition is much to be desired. This factor is extremely important to the farmer, particularly in pea growing areas where the vines and leaves cannot be sold profitably for cattle fodder as in areas of the country where dairying is a major industry.

A third important consideration in the design of a cutter bed is that it must be sufficiently open and non-clogging in operation to allow the pods which are substantially free of vines and leaves to drop through the cutter bed freely so that the pods are not exposed to the action of succeeding cutters which increases the possibility that the pods may be damaged. Moreover, the cutter bed should be sufficiently open so that the vines and leaves, when they have been cut to a relatively finely divided condition, will drop or be forced through and below the bed so as to clear the cutter bed as promptly as possible to expose succeeding material or partially cut material traveling over the cutter bed to the cutting action of the cutting or severing elements. In other words, if the forward portion of the cutter bed reduces a part of the vines and leaves to a relatively finely divided condition and succeeds in producing some pods substantially free of vines and leaves, this material should drop or be forced below the level of the cutter bed to enable succeeding cutters to act upon uncut or only partially cut material.

Another important consideration in the design of the cutter bed lies in the fact that the pods should preferably be substantially stripped of vines and leaves. While the complete removal of vines and leaves from the pods is not entirely practical in the space limitations necessitated by the requirement that the machine shall not be excessive in size and weight, most of the pods should be reasonably free of vines and leaves. This aspect is important because any vines and leaves attached to the pods must be hauled to the cannery and must be disposed of there at greater expense. However, more important is the fact that if a substantial cluster of vines and leaves are left attached to a pod, the separation of the vines and leaves from the pods becomes more difficult because to secure adequate separation without pods being blown back on the land, there must be a difference in the specific gravity of the leaves and vines from the pods. When a cluster of vines and leaves is left attached to a pod, its specific gravity does not materially differ from a cluster of vines and leaves without pods. This results in blowing too large a percentage of pods back on the land with the vines and leaves and represents a waste of peas.

A further important consideration is that the cutters must be designed to at least assist in urging the material over the cutter bed; and the material to be cut should be maintained in a relatively loose, unmatted condition for exposure of the vines to the severing action of succeeding cutters. Moreover, the cutter bed must so support the material to be cut, except for material adequately cut adjacent the entrance end of the cutter bed, that before the material reaches the end of the cutter bed, each vine is exposed to the severing action of a number of cutter elements to thereby accomplish the removal of the maximum amount of vines and leaves from the pods possible within the limits of a practical machine insofar as size and weight is concerned. In addition, the action of the cutter bed must be fast because the machine is expensive to build and it must be capable of harvesting a number of acres of peas in a day.

Perhaps the most important factor distinguishing the cutter bed of this invention from those with which I have previously experimented is that the cutters or severing elements lie above the plane over which the material being cut is urged. Cut material then falls by gravity below the level of the cutting elements and clogging of the cutting elements is substantially completely avoided. The cutter bed of this application is substantially self-cleaning and little or no necessity of shutting down the machine for the purpose of cleaning has been experienced. While the cutter beds with which I have previously experimented were designed and intended to be self-cleaning, the attainment of this objective was not always possible. Moreover, the arrangement of cutting elements with respect to each other is such that the cutter elements clean each other of cut material.

An object of my invention is to provide a machine for cutting the stems and leaves from the pods of pod type vegetables in which the movable cutter knives and the mechanism for driving them is above and out of the way of the path of travel of the vine material as it traverses the machine from the entrance end of the machine to the discharge end.

Another object of my invention is to provide a multiplicity of cutting elements each of which is separately removable without disturbing any other cutting element and without disturbing the driving mechanism therefor.

The objects of the invention are the overcoming of the above problems particularly the design of a cutter bed so that it is substantially non-clogging and self-cleaning; so that the vines and leaves are relatively finely divided; the pods are substantially free of vines and leaves; and so that damage to the pods is reduced to a minimum.

Other objects and advantages of this invention will be set forth in the claims and will be apparent from the following description, when taken in connection with the accompanying drawings, in which:

FIG. 4 is a perspective view illustrating the cutting action as the material moves across the bed from the material entrance to the material discharge end of the machine.

Figure 1:
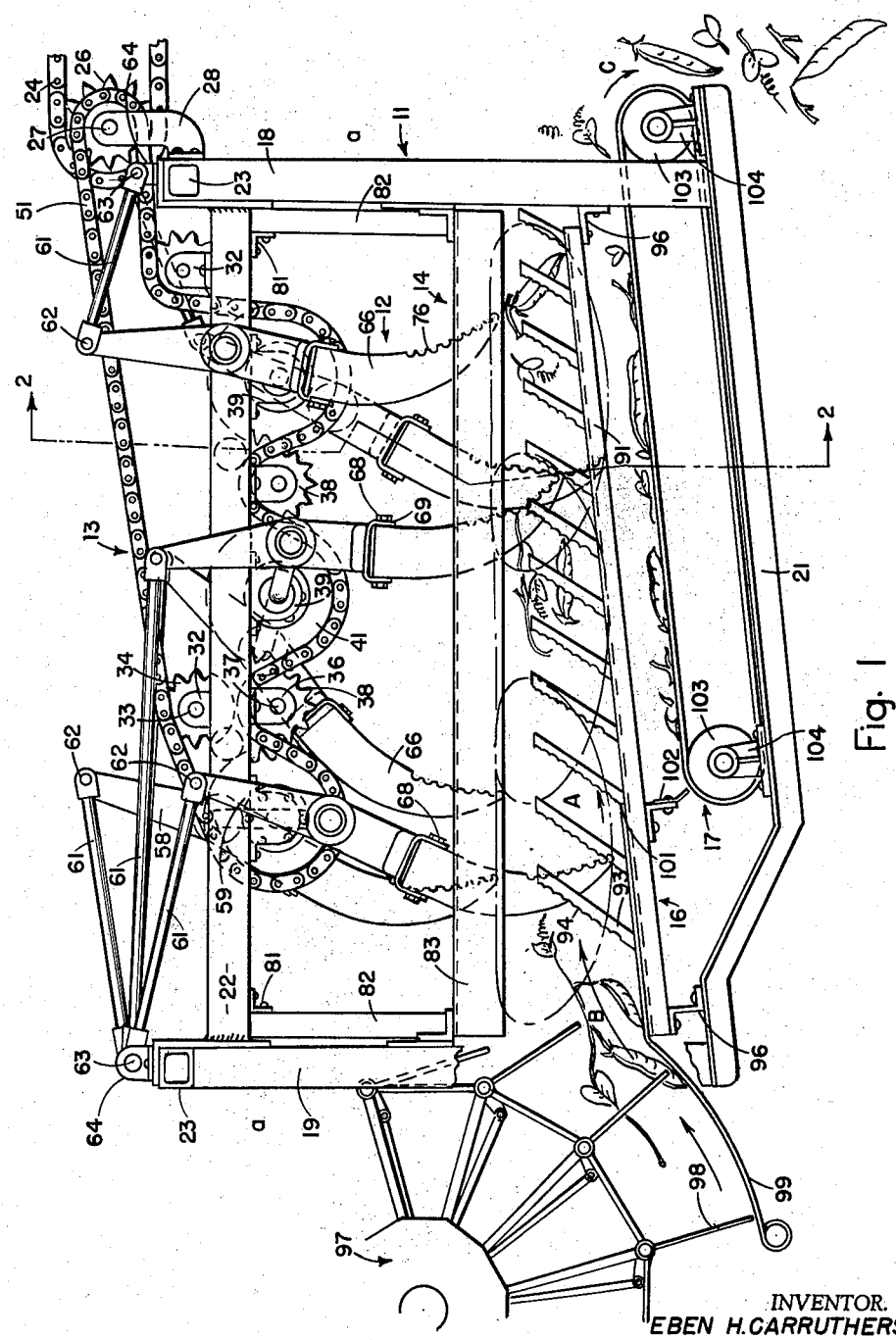
FIG. 1 is a side elevation of the machine of my invention.

The cutter bed or means for snipping, cutting or severing the vines, and leaving the pods for most part intact and substantially free of vines and leaves comprises a frame generally indicated by the numeral 11; a multiplicity of cutting knives 12 extending longitudinally and transversely of the machine; a driving mechanism, generally indicated by the numeral 13 for driving the movable cutter knives or severing elements; a plurality of longitudinally extending stationary cutting elements, generally indicated by the numeral 14; a cutter bed, generally indicated by the numeral 16; and a conveyor generally indicated by the numeral 17.

The main frame 11 of the machine is made up primarily of box-type structural elements and includes two rear structural elements 18 on opposite sides of the machine; and two front structural elements 19 located on opposite sides of the machine. The forward and rearward structural uprights 18 and 19 are welded to a pair of bottom structural elements 21 located on opposite sides of the machine. The frame also includes a plurality of longitudinally extending structural elements 22 which tie the frame together and serve as supports for the mechanism for driving the cutter or severing elements 12. The opposite sides of the frame are tied together by transverse structural members 23 welded to the uprights 18 and 19 and welded to the longitudinally extending structural elements 22.

Figure 2:
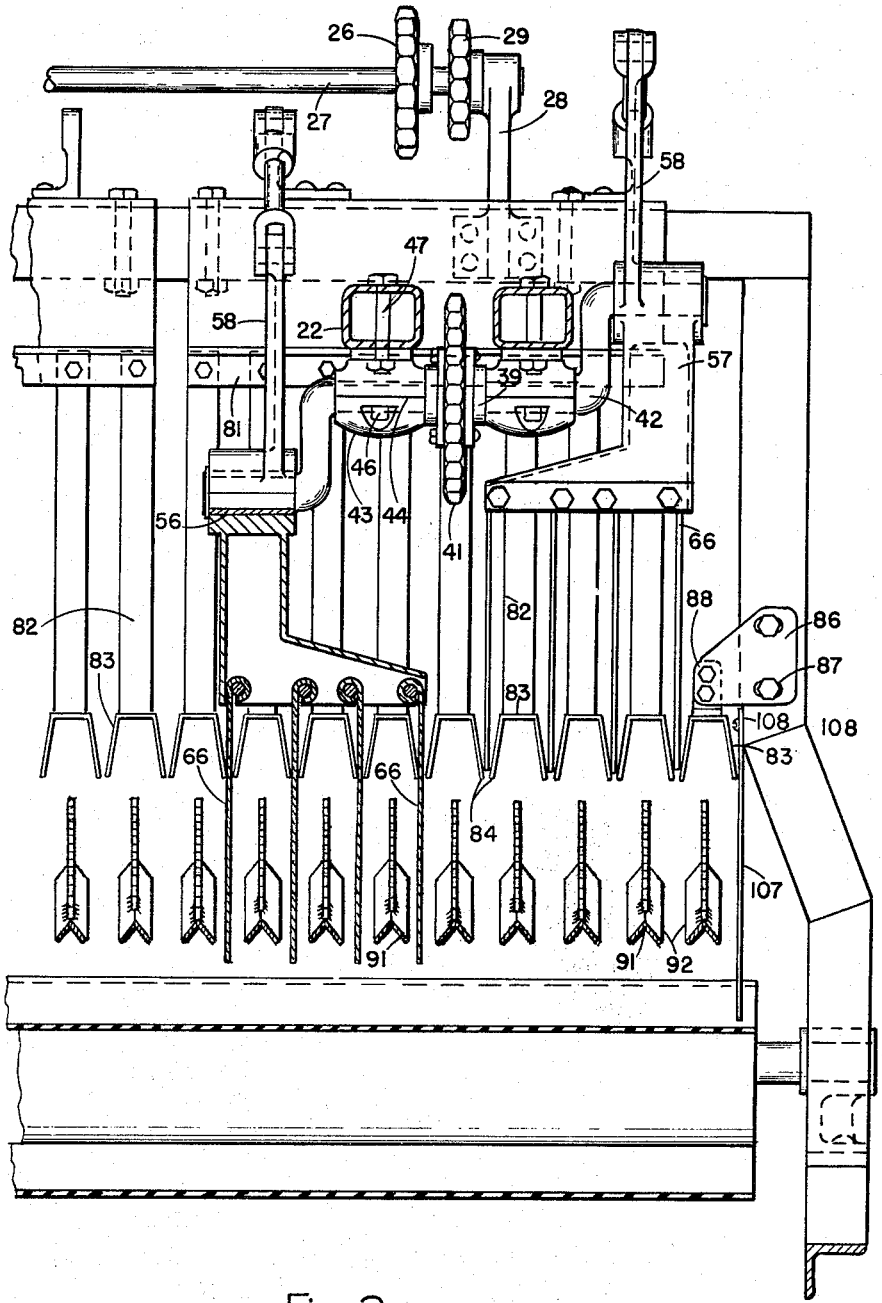
FIG. 2 is a sectional view taken substantially on the line 2—2 of FIG. 1 in the direction indicated by the arrows.
Figure 3:
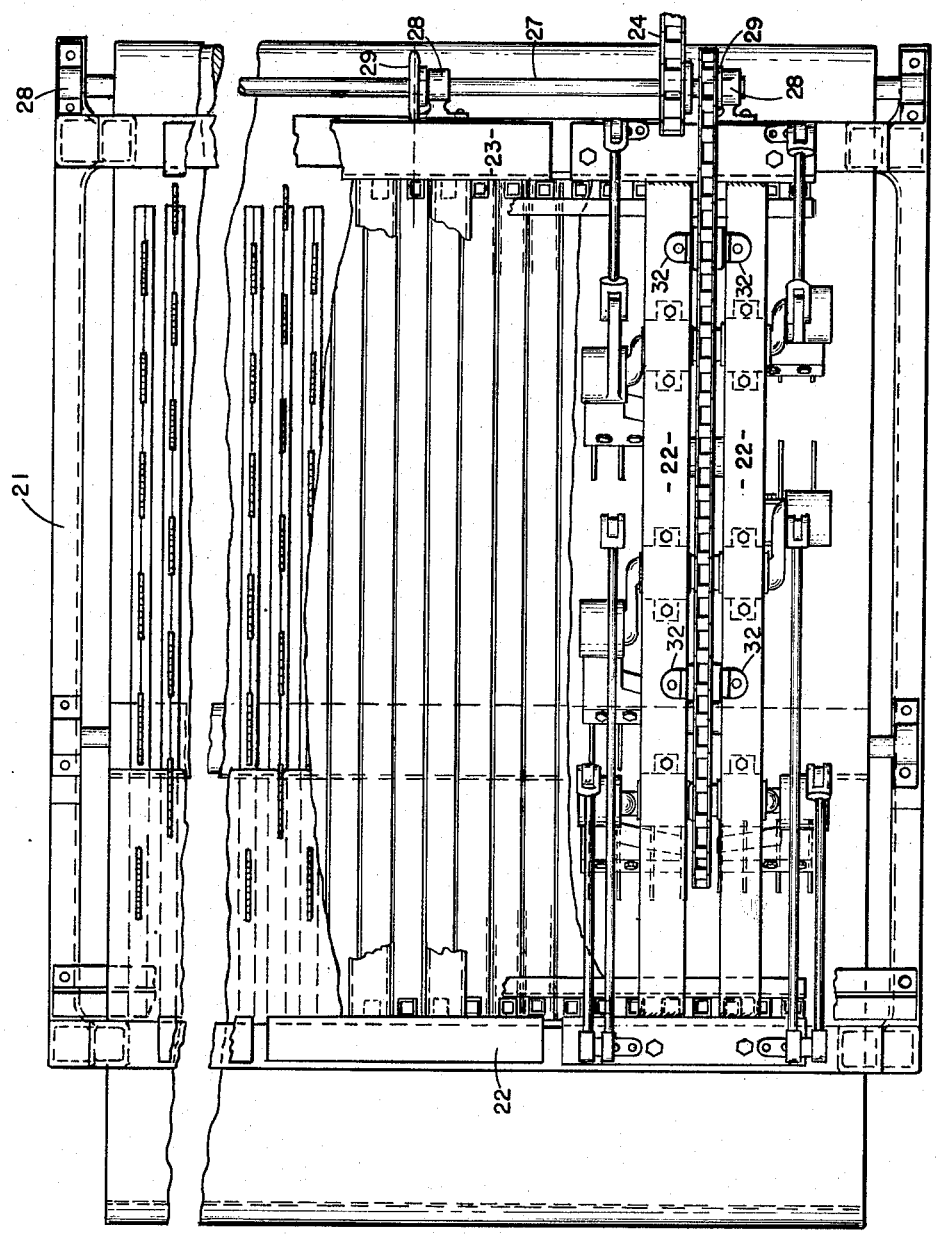
FIG. 3 is a top plan view of the machine with parts broken away to illustrate the constructions at various levels of the machine.

The machine is driven from a source of power (not shown) mounted on the movable conveyance. The source of power drives a chain 24 which passes over a drive sprocket 26 (FIG. 2). The drive sprocket 26 is fixed to a shaft 27. The shaft 27 is mounted in bearings carried by brackets 28 bolted or otherwise secured to the rear transverse frame member 23. Rigidly secured to the shaft 27 are a plurality of driven sprockets 29 (FIG. 3). The number of such sprockets corresponds to half the number of sets of movable cutters or knives employed in the machine as will be more fully discussed later.

Each of the longitudinal members 22 carries along its upper faces a plurality of support brackets 32 as shown in FIG. 1 (see also FIG. 3). The support brackets 32 on two adjacent structural members 22 are in alignment transversely of the machine and carry shafts 33 upon which rotate idler sprockets 34. Extending downwardly from the structural members 22 are brackets 36. The downwardly extending brackets on adjacent structural members 22 are in alignment transversely of the machine and carry shafts 37. The shafts have idler sprockets 38 freely rotatable thereon.

Mounted on the underside of the structural hollow beams 22 are a plurality of brackets 39 (FIG. 1) which support a plurality of sprockets 41 rigidly secured to the shaft portions of cranks 42. The shafts of the cranks 42 are carried in shell bearings 43 which are separable as indicated at 44, the shells being held together by bolts 46. The bearings are suspended from the hollow beams 22 by bolts 47 (FIG. 2).

A drive chain 51 (FIG. 1) passes over the driven pulley 29, part way around the idlers 34 and 38, and under the sprockets 41. The direction of movement of the drive chain 51 is such that the sprockets 41 and the cranks 42 rotate in a counter-clockwise direction as viewed in FIG. 1. The ends of the cranks 42 carry bearings 56 (FIG. 2) and knife or cutter supports 57 are journaled on the bearings 56.

Associated with each of the knife supports and rigid therewith is a crank arm 58 comprising a tail piece 59 and a rod 61. These elements are pivoted together as shown at 62 and pivoted as shown at 63 on brackets 64. It will be appreciated from the construction shown that the path of movement of the knife or cutter supports 57 is a controlled movement designed to move the knives 12 in a desired path of movement.

Each of the knife supports 57 carries, in this instance, four knife or cutter elements 66, the upper ends of which are curled, as indicated, at 67 to receive a pivot pin 68. The legs of a yoke 69 are adapted to receive the pivot pin or bolt 68 upon which the curled-over part 67 is adapted to rotate. Thus, as viewed in FIG. 2, the knives are free to shift laterally.

The mechanism above described is in fact a double crank designed to move the knives in a preferred path of movement in the direction indicated by the arrow "A" and its associated curvilinear or somewhat elliptical path indicated in FIG. 1. The edges of the knives facing downstream of the machine are provided with serrations 76 adapted to hook vines and carry the vines with the knives as will be more particularly described later. It will be appreciated that a part of the movement of the knives is from the rear of the machine towards the front and if desired the edges of the knives facing toward the front of the machine may also be serrated.

A pair of brackets 81 are supported from the undersides of the structural members 22 at opposite ends of the machine. A number of these brackets are provided transversely of the machine to support posts 82 each of which is secured in any suitable manner to a plurality of stationary knife, cutting or severing elements 83. The stationary knife elements 83 extend longitudinally of the machine and are approximately U-shaped in cross section with the open ends of the U extending in a downward direction. The cutting or severing edges 84 of the stationary cutting elements 83 are spaced slightly from each other, as shown in FIG. 2, to allow the movable cutting elements or knives 66 to pass upward and downward between the stationary cutting edges 84. Preferably the outer stationary cutting elements 83 at each side of the machine are mounted on a bracket 86 which is slotted, as shown at 87, so that the brackets and support 88 for the stationary cutting elements 83 may be shifted laterally to adjust clearance.

During the operation of the cutting or severing knives 66 the mass of freshly cut vines, leaves, pods and stems cut from the field is moved along a bed 16 comprising a plurality of spaced longitudinally extending members 91 which are V-shaped in cross section as shown in FIG. 2 to provide a space 92 through which cut material may drop. That is, when the mass of material is in an uncut condition, the vines, leaves and pods are supported on the longitudinally extending members and urged by the movable cutting knives from the entrance end of the machine toward the discharge end thereof as indicated by the arrow "B." When the mass of material has been sufficiently cut it is free to drop through the spaces 92 onto the conveyor 17.

Each of the longitudinally extending members 91 has a multiplicity of knives or rakers 93, the edges facing toward the forward end of the machine being provided with serrations 94. The longitudinally extending members forming the bed 16 are supported by transversely extending brackets 96 at an upwardly sloping angle so that the knives 66 towards the discharge end of the machine reach down inbetween the longitudinally extending members 91 as indicated at the right of FIG. 1. The rakers or knives 93 are preferably gradually decreased in length and are tilted at an angle extending towards the discharge end of the machine so that the top edges of the rakers are preferably at substantially the same horizontal level, as shown in FIG. 1.

Material cut from the fields by a sickle bar or equivalent is carried by a rotatable reel generally indicated by the numeral 97 having tines or bats 98. The material is conveyed by the tines over a pan or apron 99 suitably supported (not shown) adjacent the front of the machine. The apron or pan extends over the forward edge of the bed 16 to a point indicated at 101 and the forward end of the conveyor which is approximately below this point. Thus cut material flows onto the conveyor being confined by a baffle 102 which extends transversely of the machine and prevents cut material from falling off the forward end of the conveyor. The conveyor extends the full width of the machine and is mounted on driving rollers 103 carried by brackets 104. The conveyor is driven in the direction indicated by the arrow "C" from any suitable source of power (not shown). The purpose of extending the pan or apron 99 onto the bed is to enable the front wheels of the machine to be located adjacent the numeral 96 and lower the center of gravity of the machine.

After the material has been cut and the pods are substantially free of vines and leaves and the vines and leaves are in a relatively divided state, they are discharged from the conveyor, as indicated at the right of FIG. 1, where they are acted upon by means for separating the pods intact with the peas therein, protected against dust and dirt, from the leaves and vines which may be similar to the means shown in the above mentioned patents.

A sheet metal shield 107 is secured, as shown at 108, to the uprights 18 and 19 and extends substantially the full length of the machine at the opposite sides thereof. The shield confines the mass of material and the cut material within the confines of the machine so that cut material will fall on the conveyor for transport to the discharge end of the machine.

It will be understood from the foregoing that after the pod type plants have been removed from the field they are fed to the machine by the reel 97. Upon being fed to the apron the mass is picked up on the downward movement of the upstream faces or hooked portions of the knives and pushed along the cutter bed. The knives 66 are actuated at a rate of speed such that it is impossible to determine precisely what is occurring. However, tests have shown that the vines are severed a number of times as they pass through the machine and the vines and leaves are relatively finely divided. Moreover, for the most part, the pods with very little vine material attached are kept intact with the peas therein protected against loss of moisture and exposure to the elements. The pods after being separated from the vines and leaves are loaded in a truck and carried to the cannery where they are opened by any suitable means and prepared for canning or freezing.

One of the distinct advantages of the cutter bed of this invention as compared to the cutter beds shown in the above mentioned patents and in my application Ser. No. 130,456 filed November 7, 1958 is that the primary cutting elements are located above the bed or longitudinally extending members 91 whereby all cut material tends to fall by gravity. When the material has been cut sufficiently, it falls through the longitudinal spaces between the bars 91 onto the conveyor. The location of the primary cutting elements above the bed also means that the driving parts, in fact, all mechanical parts except parts of the conveyor are located adjacent the top of the machine and well above the severing space. Access to these parts for lubrication or repair can be accomplished without difficulty. In any severing or tearing action on a mass of vegetable matter, juices are inevitably released. These juices in the present machine do not come into contact with the operating mechanism to any substantial extent. A further advantage in having the cutting elements and the operating mechanism therefore above the bed lies in the fact that the bed is at a low level compared to the ground level and only a short lift from ground level to the bed is necessary.

Another fact of importance is that the movable cutter or severing elements 66 can be individually replaced or removed for sharpening by removing the bolts 68 and without disturbing any other cutting elements and without disturbing any of the driving mechanism. Moreover, the mounting arrangement permits lateral shifting of the movable cutters so that they seek their own position with respect to the stationary cutting edges 84 of the longitudinally extending U-shaped members 83. This lateral positioning of the movable cutting elements with respect to the cutting edges 84 is assisted by the U-shape of the members 83 in which the movable cutters move. Each cutting unit comprising eight movable cutter bars may be removed as a unit by unbolting it from the main frame and disconnecting the drive chain for that unit.

The cranks 42 may be set in the most advantageous position with respect to each other within 60° intervals by positioning the bolting 46. Adjacent knife gangs can be set in the most favorable relationship to each other by positioning the sprockets anywhere along the chain within the limits of points of interference of adjacent knife gangs in the cutting cycle. In general, the first knife set would pick up the material adjacent the entrance end of the bed and deliver it to a point downstream. When this set of cutter knives is moving back towards the entrance end of the machine, the next set of knives is moving rearward to pick up the material pushed forward by the first set of knives. This process is continued until the material is discharged from the machine. In the drawings I have shown only a limited number of sets of knives both transversely and longitudinally of the machine, but it will be appreciated that the machine may be made any desired size by increasing the number of sets of knives in both the longitudinal and transverse direction within the limits of transport of the machine over highways.

In FIG. 4 I have endeavored to show the action which I think is taking place during the operation of the machine but, as previously mentioned, the knives are operating at such a rapid rate of speed that it is impossible to tell precisely what is occurring. As the knives move, the vines are rapidly drawn through the cutting space during part of the movement and upward toward the shear bars at another phase of their movement. During this rapid pull-through some of the pods are removed by the vines being snapped or drawn across the raker fingers 93, this being illustrated at the left of FIG. 4. On the upward motion of the movable severing knives, the vines are severed as they are drawn upward between the cutting edges 84 of the shear bars 83. This action is illustrated at the right of FIG. 4. The backward sweep of the knives (movement toward the entrance end of the bed), part of which can be seen in FIG. 1, tends to clear the serrations or notches 76 of vine fragments. True shear is not necessarily maintained at the severing edges 84 of the shear bars. The action may be one of tearing the vines apart, such tearing does not load the notches with vine fragments. Moreover, vine fragments do not appear to be deposited on the rake fingers 93 possibly because of their rearward inclination but more likely because the mass of material is being drawn up past them and tends to clear the rakers 93 of any vine fragments which may be caught.

It will be noted that the tips of the knives dip below the vine carrier bars or bed 16 at the downstream end of the machine. At this point there are very few pods left as most of them have dropped below the bed to the conveyor and this dipping of the knives below the bed tends to exert a positive chopping action on the vines and leaves which further appears to mitigate against clogging the bed.

It will be further noted that the tips of the knives 66 move through a somewhat oval or elliptical path. This path is somewhat flat at the top and curved at the bottom and the fore and aft movement is substantially greater than the up and down movement whereby the path of movement of pairs of adjacent sets of knives in the same longitudinal row overlap each other. Moreover, on the return stroke the knives back away from the material and the cut material tends to drop by gravity to the bed. The action is one of mutual self-cleaning of the movable cutting knives and cutter bars. Thus, there is no position on the bed where material will lodge and not be picked up by the knives, severed as the material is pulled upward toward and into contact with the shearing edges 84 and rakers 93 and urged towards the discharge end of the machine.

In the drawings I have illustrated only a few vines, leaves and pods to illustrate the action which I believe is taking place. In practice a mass of material will be passing through the machine at any given time.

While I have shown and described the preferred forms of mechanisms of the invention, it will be apparent that various changes and modifications may be made therein, particularly in the form and relation of parts, without departing from the spirit of the invention as set forth in the appended claims.

I claim:

1. A cutter bed for removing vines and leaves from the pods of pod type vegetables comprising, in combination, a bed for supporting a mass of vines, leaves and pods fed to the bed, a multiplicity of knives mounted above the bed, means for mounting said knives for movement, said knives having at least three components of movement, an upward component, a downward component, and a reciprocating component, said knives extending downward toward the bed and being arranged in a plurality of rows with the rows extending longitudinally of the bed, means for actuating said knives and means having a plurality of slots mounted above the bed through which the knives extend, the margins of said slots providing edges cooperating with said knives as the knives are drawn upward through the slots to sever the vines.

2. A cutter bed in accordance with claim 1 in which the bed has slots extending longitudinally of the bed permitting pods substantially free of vines and leaves and relatively finely cut vines and leaves to drop through the bed.

3. A cutter bed in accordance with claim 1 in which the knives urge the mass of material over the bed and are curved in the direction in which they urge the material.

4. A cutter bed in accordance with claim 1 in which the knives are free to shift laterally and the ends thereof move through an orbital path.

5. A cutter bed in accordance with claim 1 in which the bed comprises a plurality of longitudinally extending members having spaces between them and a longitudinal row of knife like elements extending upwardly from said members against which the actuated knives drive material being cut.

6. A cutter bed in accordance with claim 1 in which the actuating means for the knives comprise cranks which carry the knives extending transversely of the bed, sprockets rigid with said cranks with a plurality of sprockets being aligned longitudinally of the bed and means comprising chains passing over said sprockets for driving the same.

7. A cutter bed for removing vines and leaves from the pods of pod type vegetables comprising, in combination a bed comprising a plurality of longitudinally extending members having spaces between them through which cut material including vines, leaves and pods may fall, a longitudinal row of knife like elements extending upwardly from each of said members and means comprising severing knives extending downwardly toward the cutter bed for engaging a mass of uncut material fed to the bed and driving it against said elements and means for driving said downwardly extending means through an oscillatory path.

8. A cutter bed in accordance with claim 7 in which said knife like elements extend upward and in the direction of flow of said material and said downwardly extending means are the means for urging the mass of material over the bed.

9. A cutter bed in accordance with claim 7 in which the downwardly extending means are knives driven with a rotary motion.

10. A cutter bed in accordance with claim 9 in which the downwardly extending knives and said knife like elements are both serrated.

11. A cutter bed for removing vines and leaves from the pods of pod type vegetables comprising, in combination, a bed for supporting a mass of vines, leaves and pods fed to the bed, said bed having a material entrance end and a material discharge end, a multiplicity of movable knives mounted above the bed, said knives extending downward toward the bed and being arranged in a plurality of rows with the rows extending longitudinally of the bed, means having a plurality of slots mounted above the bed, the margins of said slots providing edges co-operating with said knives as the knives move with relation to said edges to sever the vines, means for moving said knives through an oscillatory path of travel such that the material is urged over the bed from the entrance end toward the discharge end, said path of travel including a downward movement through said slots and through the mass of material, a movement through the material toward the discharge end, an upward movement to draw the mass toward the margins of said slots and sever the vines and a rearward movement to release material caught on the knives, said bed having a multiplicity of openings to allow cut material including pods to drop to a position below the bed and a conveyor mounted below the bed to carry cut material to a point of disposal.

12. A cutter bed in accordance with claim 11 in which the knives are free to shift laterally and may be individually removed for replacement or repair.

13. A cutter bed in accordance with claim 12 in which the knives are hook-shaped with the hooks facing the discharge end of the machine.

14. A cutter bed in accordance with claim 11 in which the bed comprises a plurality of longitudinally extending members having spaces between them and a longitudinal row of knife-like elements extending upwardly from said members against which the movable knives drive material being cut.

15. A cutter bed for removing the vines and leaves from the pods of pod type vegetables comprising, in combination, a bed having a material entrance end to which material is fed and a material discharge end, said bed comprising longitudinally extending bars having spaces between them through which cut material and pods substantially free of vines may fall, a multiplicity of movable knives mounted above the bed, said knives being somewhat hook-shaped with the hooks facing downstream, means extending longitudinally of the bed above the bed having longitudinally extending slots downward through which the knives extend, said slots defining cutting edges along the longitudinal edges of said means, means for moving said knives through an oscillatory path with an amplitude of movement greater in the direction of movement of the material on the bed than in the up and down direction, means for controlling the movement of the knives so that the knives adjacent the entrance end of the bed pick up the material and exert, in cooperation with said cutting edges, a severing action on the vines and deposit the partially cut material downstream from the entrance of the bed, the next knives downstream of the bed being out of phase with the first knives so that material moved downstream is picked up by the second knives and the cutting action is repeated.

16. A cutter bed for removing vines and leaves from the pods of pod type vegetables comprising, in combination, a bed having an entrance end and a discharge end for supporting a mass of vines, leaves and pods fed to the bed at the entrance end, a multiplicity of knives mounted above the bed and spaced longitudinally along the length of the bed, means for mounting said knives for movement, said knives having at least three components of movement, an upward component, a downward component, and a reciprocating component and in a direction such that the knives urge the mass toward the discharge end of the bed, means mounted above the bed and extending in the direction of feed of the material cooperating with the knives during their movement to sever the vines with the pods for the most part remaining intact with the peas sealed therein protected against dust and dirt and substantial loss of moisture, means for actuating said knives.

17. A cutter bed in accordance with claim 16 in which the bed has slots extending longitudinally of the bed permitting pods substantially free of vines and leaves and relatively finely cut vines and leaves to drop through the bed.

18. A cutter bed in accordance with claim 16 in which the knives are curved in the direction in which they urge the material.

19. A cutter bed in accordance with claim 16 in which the knives are loosely mounted and free to shift laterally and the ends thereof move through an orbital path.

20. A cutter bed in accordance with claim 16 in which the bed is stationary and the knives are the sole force urging the mass over the bed.

21. A cutter bed in accordance with claim 16 in which the bed is stationary, the knives are the sole force urging the mass over the bed and the means cooperating with the knives are longitudinally extending spaced members having severing edges and the movement of the knives has a component moving the knives inward and outward of said spaces.

References Cited in the file of this patent

UNITED STATES PATENTS

| | | |
|---|---|---|
| 2,311,169 | Gordon et al. | Feb. 16, 1943 |
| 2,487,911 | Wehn | Nov. 15, 1949 |
| 2,700,976 | Hopkins | Feb. 1, 1955 |
| 2,728,344 | Dauenhauer | Dec. 27, 1955 |
| 2,763,114 | Carruthers | Sept. 18, 1956 |
| 2,825,375 | Gotelli et al. | Mar. 4, 1959 |